March 2, 1965  E. SVEREIKA  3,171,537
BALE DUMPING DEVICE
Filed July 14, 1961
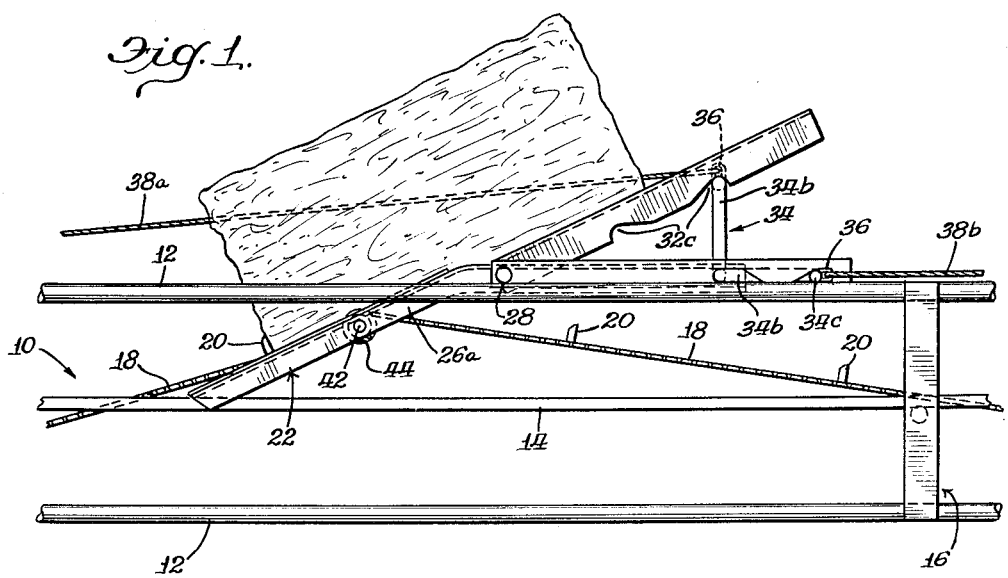
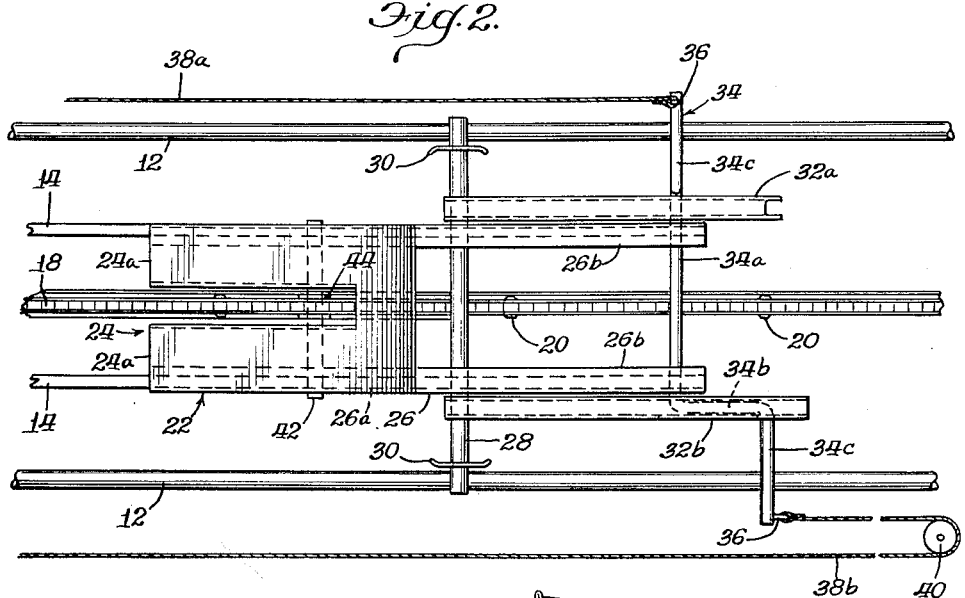
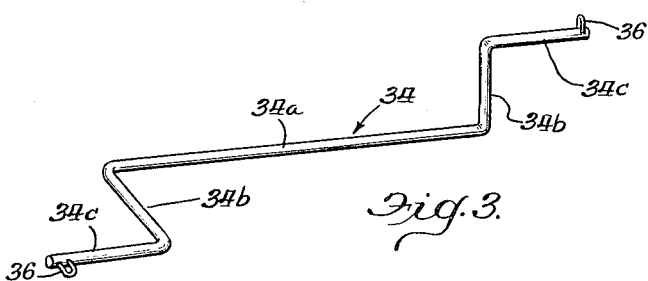
INVENTOR.
Edward Svereika
Paul O. Rippel
Atty.

3,171,537
BALE DUMPING DEVICE
Edward Svereika, Chicago, Ill., assignor to International Harvester Company, Chicago, Ill., a corporation of New Jersey
Filed July 14, 1961, Ser. No. 124,085
6 Claims. (Cl. 198—185)

This invention relates to a material handling mechanism and more particularly to an elevating and conveying apparatus for articles such as bales of hay or straw. Specifically, the invention relates to means for use in conjunction with a bale conveyor for diverting movement of the bales as they are being conveyed.

This invention is adapted for use in conjunction with elevators and conveyors of the type generally found on farms. A typical elevator generally comprises a base having a support which extends from a lower material receiving end upwardly to an elevated material discharge end. The base includes a source of power as an internal combustion engine or electric motor used to drive the conveyor assembly which may be of the endless chain variety. The conveyor is generally suspended within a barn or shed and has in association therewith a bale dumping device or diverter which may be positioned at will therealong for the purpose of dumping bales from the conveyor.

It is an object of this invention to provide a bale diverter which may be easily and inexpensively constructed from readily available materials and which will withstand the shocks of severe use.

Another object of this invention is the provision of a bale diverter which eliminates the necessity for using mechanical biasing devices by employing gravity therefor.

A further object of this invention is the provision of a bale diverter which topples bales from its associated conveyor as the bales move therealong without deviating the path of travel of the bales.

Still another object of this invention is the provision of a bale diverter having an inclined trough and a pair of pivotal dump arms which may be controlled through crank arms from a remote position to alternate inclined positions whereby bales coming in contact therewith are tumbled from their path of travel and off the conveyor.

With the foregoing objects in view, and such other objects and advantages as will become apparent to those skilled in the art to which this invention relates as the specification proceeds, this invention consists essentially in the arrangement and construction of parts all as hereinafter more particularly described, reference being made to the accompanying drawing in which:

FIG. 1 is a side elevational view showing a conveyor and bale dumper positioned thereon in position to dump a bale therefrom;

FIG. 2 is a top elevational view of the conveyor and the bale diverter; and

FIG. 3 is a perspective view showing details of the crank.

The principles of this invention are equally applicable whether the arrangement thereof is utilized as an attachment for existing elevators and conveyors or as a part of a machine especially designed for handling bales.

As seen in the drawings, the bale conveyor 10 comprises the side frame members 12 and the intermediate frame members 14, all of which may be of tubular construction. Frame members 12 and 14 are secured at convenient intervals to the support members 16 as by welding. It is to be understood, however, that for ease of assembly and disassembly the entire conveyor structure may be bolted together. Suitable hangers are provided for suspending conveyor 10 and may be attached to support members 16. A conveyor chain 18 having mounted thereon at convenient intervals a plurality of flights 20 moves between intermediate frame members 14 and is guided by sprockets at convenient locations along the conveyor. Chain 18 is driven from the power source of an associated elevator of conventional design not comprising a part of this invention.

The bale dumping device or diverter 22 includes an inclined trough 24 having spaced leg portions 24a which are supported by the bracing members 26. Bracing members 26 include inclined portions 26a resting upon intermediate frame members 14 and upper portions 26b extending generally parallel to intermediate frame members 14. Bracing members 26 may be constructed of angle irons or alternatively may be flared at the lower ends thereof to form movable runners contacting intermediate frame portions 14. Rigidly secured to upper portions 26b of bracing members 26 is the shaft 28. Shaft 28 extends outwardly beyond bracing members 26 in order to maintain sliding contact with side frame members 12, thus providing additional support for the bale dumper 22. The guides 30 secured to shaft 28 serve to limit the transverse movement thereof relative to frame members 12 and 14, thus holding bale diverter 22 in its operating position.

A pair of dump arms 32a and 32b including the locking notches 32c are pivotally mounted upon shaft 28 intermediate the upper portions 26b of bracing members 26 and guides 30. Each of the dump arms 32a and 32b is freely pivotal about shaft 28 and is biased by gravity. The crank 34, more clearly shown in FIG. 3, controls the position of dump arms 32a and 32b. One form of crank 34 includes the central portion 34a and the intermediate portions 34b and to each other. Outwardly of intermediate portions 34b extend the end portions 34c in a direction parallel to central portion 34a. Central portion 34a is pivotally secured to portions 26b of bracing members 26. Intermediate portions 34b are so oriented as to lie in the planes of dump arms 32a and 32b in order to act as supporting cams or levers for the positioning of the dump arms. End portions 34c extend outwardly beyond side frame members 12 in sliding contact therewith.

To the extreme ends of end portions 34c of crank 34 are attached the eyes 36. The cables or control ropes 38a and 38b, attached to eyes 36, extend to a remote position from which the entire bale dumping device may be controlled. One control rope 38a extends directly from its eye 36 along the length of the conveyor to the remote operating position. The other control rope 38b extends in an opposite direction and over a pulley 40 mounted at a convenient point adjacent the extreme end of conveyor 10 and thence to the remote operating position.

Between inclined portions 26a of bracing members 26 is mounted a shaft 42 which in turn carries the idler sprocket 44 centrally of leg portions 24a of trough 24 and upwardly of intermediate frame members 14.

In operation, chain 18, carrying flights 20, moves over idler sprocket 44 and pushes a bale upwardly along inclined trough 24 of diverter 22. The bale contacts one of the dump arms 32a or 32b in its dump position and is toppled away from conveyor 10. The position of the dump arms 32a and 32b may be alternated by a single tug on the control rope 38a or 38b. This will rotate the crank 34 and move respective crank portions from contact with one of the locking notches 32c into contact with the other, thus pivoting the dump arms from a position parallel to side frame members 12 to the dump position parallel to inclined portions 26a of trough 26, alternately. Assuming the position shown in FIG. 1, a single pull on the control rope 38a will rotate the crank 34, lowering dump arm 32a and elevating dump arm 32b, while a second pull on the control rope 38a will, after this rotation, move the entire bale dumping device 22 along frame members 12 and 14 of conveyor 10. Similarly, a single pull on the control rope 38b would then rotate crank 34 in the opposite direction in order to alternate the position of the dump arms. A second pull on the control rope 38b would then move the entire diverter in an opposite direction along the conveyor 10.

Thus it will be seen that the bale dumping device may be operated at will from a position remote of the device and indeed outside the barn or shed if desired, the same control ropes operating the dumping arms to selectively dump bales to the right or the left of the conveyor. Bales continue moving in a straight line along the length of the conveyor until, upon contacting a single dump arm, they are caused to topple away from the conveyor into a convenient pile. It is unnecessary to divert the direction in which the bales are conveyed, thus eliminating the possibility of obstruction and jamming which would require manual clearance.

It is to be understood that the foregoing description and the accompanying drawing have been given only by way of illustration and example. It is further to be understood that changes in the elements, rearrangement of parts and substitution of equivalent elements, all of which will be obvious to those skilled in the art, are considered to be within the scope of the present invention which is limited only by the claims which follow.

I claim:

1. In combination, an elongated conveyor frame having a plurality of intermediate frame members adapted to support material as it is conveyed and a plurality of side frame members, a continuous material conveyor movable along said intermediate frame members, a plurality of bracing members movably supported on said intermediate frame members and extending therefrom, a shaft movably supported on said side frame members and supporting said bracing members intermediate the ends thereof, at least one dump arm pivotally connected to said shaft, a crank rotatably supported by said bracing members at a point spaced from said shaft, said crank having at least one crank arm selectively engageable with said dump arm to move said dump arm respectively between dump and non-dump position, and means for rotating said crank.

2. In combination, an elongated conveyor frame including at least one pair of parallel side frame members and a pair of parallel intermediate frame members centrally of and below said side frame members, a continuous conveyor chain movable between said intermediate frame members and having a plurality of flights thereon whereby to convey bales along said intermediate frame members and between said side frame members, a bale diverter supported on said conveyor frame, said bale diverter comprising a pair of bracing members each having a first portion slidable on respective intermediate frame members and extending upwardly therefrom and a second portion extending parallel to said side frame members, a shaft secured to said second portions and extending therefrom to slidably engage said side frame members, a pair of guides secured to said shaft adjacent respective side frame members, a pair of dump arms pivotally connected to said shaft outwardly of respective second portions of said bracing members and pivotal from a non-dump position substantially parallel to said second portions to a dump position substantially parallel to said first portions, each of said dump arms having a plurality of notches therein, a crank having a central portion, intermediate portions transverse to said central portion and to each other and end portions parallel to said central portion, said central portion of said crank being rotatably mounted on said second portions of said bracing members and said end portions extending therefrom beyond said side frame members, said end portions being engageable with respective notches whereby to support said dump arms in non-dump and dump positions, each of said end portions slidably engaging its respective side frame member when its associated dump arm is in the non-dump position, and a pair of ropes connected to respective end portions whereby said crank may be rotated and said diverter may be slidably moved on said conveyor frame.

3. In combination, an elongated conveyor frame having a plurality of side frames and an intermediate frame, a continuous chain conveyor mounted for movement along said intermediate frame, an inclined trough having a first portion movably supported on said intermediate frame and extending away therefrom and a second portion extending along said side frame, a sprocket mounted on said first portion of said trough for guiding movement of said chain conveyor, a shaft movably supported on said side frame and supporting said second portion, a plurality of dump arms pivotally connected to said shaft, a crank pivotally connected to said trough and having a plurality of crank arms engageable with respective dump arms to pivotally move said dump arms between dump and non-dump positions, said dump arms being provided with means for locking said crank arms upon engagement and movement to respective positions, and means for pivoting said crank between said dump and non-dump positions.

4. In a bale diverter adapted for use with a conveyor having a plurality of spaced side frames, a pair of intermediate frames within and below said side frames and a continuous chain movable within said intermediate frames, the combination comprising: a pair of bracing members each having a first portion slidable on respective intermediate frames and extending upwardly therefrom and a second portion extending substantially parallel to said side frames, an inclined trough having a central aperture mounted on said first portions of said bracing members, a supporting shaft extending transversely from said bracing members and slidably engageable with said side frames, a pair of dump arms each pivotally connected to said shaft adjacent respective second portions of said bracing members and pivotal from a non-dump position substantially parallel to said second portion to a dump position substantially parallel to said first portion of said bracing members, a crank having a central portion rotatably mounted on said second portions of said bracing members, said crank also having intermediate portions transverse to said central portion and to each other and end portions each extending outwardly parallel to said central portion for actuating said dump arms and slidably engageable with said side frames when its associated dump arm is in the non-dump position, a sprocket mounted within said central aperture and engageable with said chain, and means for operating said crank.

5. In a bale diverter adapted for use with a conveyor having a plurality of spaced side frames, a pair of intermediate frames within and below said side frames and a continuous chain movable within said intermediate frames, the combination comprising: a pair of bracing members each having a first portion movably mounted on respective intermediate frames and extending upwardly therefrom and a second portion extending substantially parallel to said side frames, an inclined trough mounted on said first portion and defining a central aperture therein, a shaft supporting said second portions and slidably engaged with said side frames, a pair of dump arms each pivotally connected to said shaft outwardly of respective second portions and pivotal from a non-dump position to a dump position upwardly of said second portions, each of said dump arms having a plurality of notches therein, a crank having a central portion, intermediate portions extending normal to said central portion and to each other and end portions extending parallel to said central portions, said central portion being rotatably secured to said second portions of said bracing members so that said end portions engage respective notches in said dump arms as said crank is rotated from a first position wherein one of said dump arms is in its dump position and the other of said dump arms is in its non-dump position to a second position wherein said one dump arm is in its non-dump position and the other dump arm is in its dump position, a sprocket mounted within said central aperture and engageable with said chain, and means for operating said crank.

6. The invention according to claim 5, said operating means comprising a pair of ropes each connected to respective end portions of said crank whereby a first pull on one of said ropes rotates said crank in order to alternate the position of said dump arms and a second pull on said one rope moves said bale diverter along said conveyor.

References Cited in the file of this patent
UNITED STATES PATENTS

| | | |
|---|---|---|
| Re. 1,264 | Wade | Jan. 28, 1862 |
| 2,885,065 | Piper | May 5, 1959 |
| 2,990,053 | Lance et al. | June 27, 1961 |